US007587956B2

(12) United States Patent
Velasco, Jr.

(10) Patent No.: US 7,587,956 B2
(45) Date of Patent: Sep. 15, 2009

(54) DEVICE FOR CONTROLLING MOTION

(75) Inventor: Howard Velasco, Jr., Bristol, CT (US)

(73) Assignee: Franklin Products, Inc., Torrington, CT (US)

( * ) Notice: Subject to any disclaimer, the term of this patent is extended or adjusted under 35 U.S.C. 154(b) by 408 days.

(21) Appl. No.: 11/511,589

(22) Filed: Aug. 29, 2006

(65) Prior Publication Data

US 2009/0071273 A1 Mar. 19, 2009

(51) Int. Cl.
*F16H 21/44* (2006.01)

(52) U.S. Cl. ............................ 74/110; 74/502; 74/503

(58) Field of Classification Search .................. 74/110, 74/501.5 R, 501.6, 502, 502.4, 502.6, 531; 24/635, 642; 248/424, 429, 430

See application file for complete search history.

(56) References Cited

U.S. PATENT DOCUMENTS

| | | | | | |
|---|---|---|---|---|---|
| 2,340,830 | A | * | 2/1944 | Arens | 74/502.3 |
| 2,449,516 | A | * | 9/1948 | Shakespeare et al. | 74/503 |
| 3,618,457 | A | * | 11/1971 | Miller | 89/185 |
| 3,741,023 | A | * | 6/1973 | Goebel et al. | 74/110 |
| 3,847,034 | A | | 11/1974 | Hemens | |
| 3,951,238 | A | | 4/1976 | Dent et al. | |
| 3,990,542 | A | * | 11/1976 | Dent et al. | 188/67 |
| 4,094,046 | A | * | 6/1978 | Takada | 24/642 |
| 4,100,657 | A | * | 7/1978 | Minolla | 24/642 |
| 4,149,300 | A | | 4/1979 | Eaton | |
| 4,464,950 | A | * | 8/1984 | Deligny | 74/501.5 R |
| 4,468,843 | A | | 9/1984 | Duclos et al. | |
| 4,709,454 | A | * | 12/1987 | Barnes | 24/573.11 |
| 4,782,715 | A | * | 11/1988 | Chevance | 74/89.39 |
| 4,856,359 | A | * | 8/1989 | Krause | 74/110 |
| 5,013,178 | A | | 5/1991 | Baker et al. | |
| 5,018,399 | A | * | 5/1991 | Sawatzki et al. | 74/110 |
| 5,018,916 | A | * | 5/1991 | Bauch et al. | 409/233 |
| 5,080,434 | A | * | 1/1992 | Locher | 297/300.8 |
| 5,263,751 | A | * | 11/1993 | Priest et al. | 292/336.3 |
| 5,758,544 | A | * | 6/1998 | Lee | 74/483 R |
| 2004/0079845 | A1 | * | 4/2004 | Wilcox | 248/188.5 |

* cited by examiner

*Primary Examiner*—William C Joyce
*Assistant Examiner*—Matthew A Johnson
(74) *Attorney, Agent, or Firm*—McCormick, Pauding & Huber LLP

(57) ABSTRACT

A device for controlling motion of an object includes a housing defining first and second cavities each extending from a first to a second longitudinal end of the housing. A partition separates the cavities. A first sliding member is movable within the first cavity, and includes a first extension extending outwardly from the first longitudinal end for being attached to an object whose movement is to be controlled. A second sliding member is movable within the second cavity, and includes a second extension extending outwardly from a longitudinal end for being pulled a variably controlled distance away from the housing. A motion limiting member communicates with the sliding members such that movement of the second extension the variably controlled distance away from the housing causes the first extension to be movable the variably controlled distance in a direction in which the second sliding member is pulled.

9 Claims, 4 Drawing Sheets

DEVICE FOR CONTROLLING MOTION

FIELD OF THE INVENTION

This invention relates generally to a motion control device, and more particularly to a device for controlling motion of an object.

BACKGROUND OF THE INVENTION

Devices for controlling motion of an object have many useful applications. One application for a control device is as a recline mechanism for backrests in aircraft seats as well as other seats. In aircraft seats, recline mechanisms are currently limited to implementation by hydraulic or pneumatic cylinders.

A second application is in aircraft seat leg systems. Aircraft seats must have the ability to be attached to a distorted floor and still stay in place in the aircraft cabin. This distortion of the floor can cause distortion of the seat frame and consequently, failure of the seat design. The control device can be used to accommodate distortion of the floor so that the seat frame can adapt as required and still pass the FAA tests.

It is an object of the present invention to provide a device for controlling motion of an object using a mechanical control in the above-mentioned situations and other situations where continuous adjustability using a mechanical control is desirable.

SUMMARY OF THE INVENTION

In an aspect of the present invention, a device for controlling motion of an object includes a housing defining a first cavity and a second cavity each extending from a first longitudinal end to a second longitudinal end of the housing. The housing includes a partition separating the first cavity and the second cavity. A first sliding (controlled) member is movable within the first cavity. The first sliding (controlled) member includes a first extension extending outwardly from the first longitudinal end of the housing for being attached to an object whose movement is to be controlled. A second sliding (controlling) member is movable within the second cavity. The second sliding (controlling) member includes a second extension extending outwardly from one of the first and second longitudinal ends of the housing for being pulled a variably controlled distance away from the housing. A motion limiting member, such as a circular member which can be, for example, spherical or cylindrical, communicates with the first sliding (controlled) member and the second sliding (controlling) member such that movement of the second extension of the second sliding (controlling) member the variably controlled distance in a direction away from the housing causes the first extension of the first sliding (controlled) member to be movable the variably controlled distance in a direction in which the second sliding (controlling) member is pulled.

DETAILED DESCRIPTION OF THE PREFERRED EMBODIMENTS

Figure 1A:
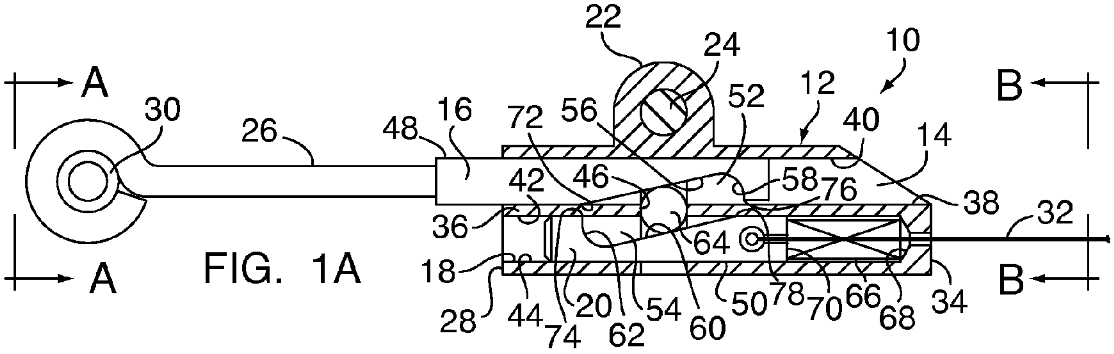
FIG. 1A is a cross-sectional, side elevation view of a motion control device in accordance with the present invention.
Figure 1B:
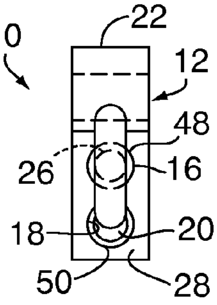
FIG. 1B is an end view of the motion control device of FIG. 1A taken along the line A-A.
Figure 1C:
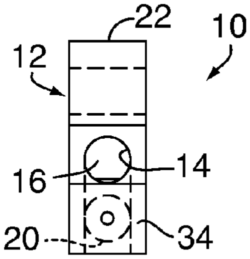
FIG. 1C is an end view of the motion control device of FIG. 1A taken along the line B-B.
Figure 2A:
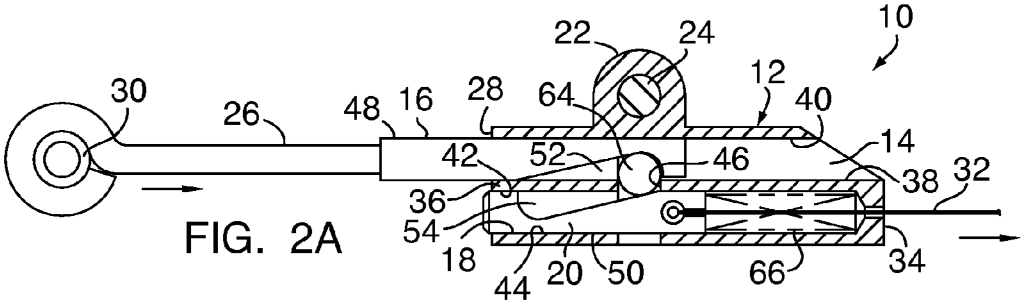
FIG. 2A is a cross-sectional, side elevation view of the motion control device of FIG. 1A in a fully extended position.
Figure 2B:
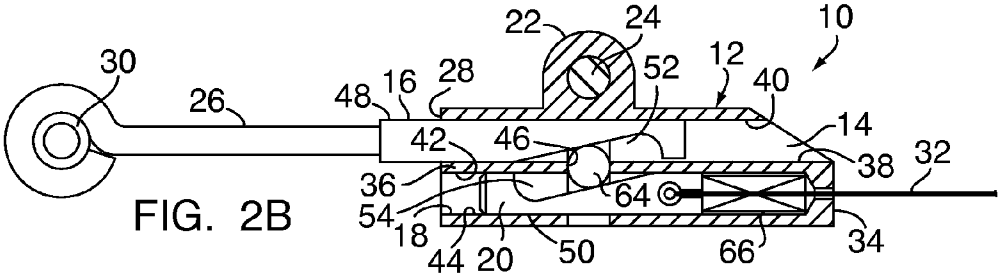
FIG. 2B is a cross-sectional, side elevation view of the motion control device of FIG. 1A in a midpoint position.
Figure 2C:
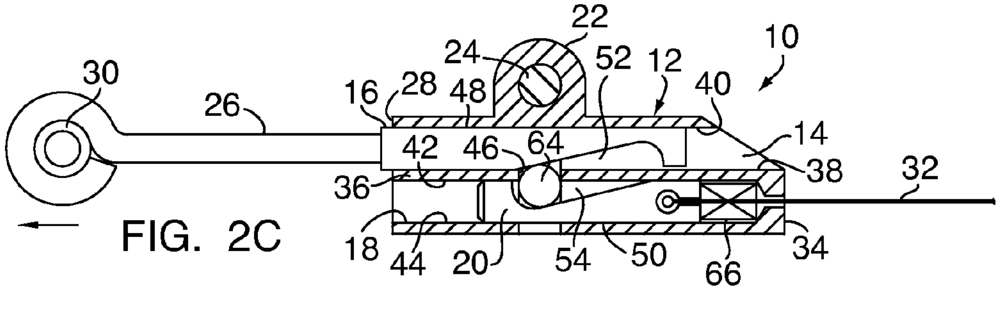
FIG. 2C is a cross-sectional, side elevation view of the motion control device of FIG. 1A in a fully retracted position.

With reference to FIGS. 1-3, a motion control device embodying the present invention is indicated generally by the reference number 10. The device comprises a housing 12 defining a first cavity 14 accommodating a first sliding (controlled) member 16 for movement therealong, and a second cavity 18 accommodating a second sliding (controlling) member 20 for movement therealong. The first sliding member 16 serves as a controlled member, and the second sliding member 20 serves as a controlling member. The housing 12 includes a projection 22 such as a mounting lug for attaching the housing to an external support 24. The first sliding member 16 includes a first extension 26 projecting outwardly from a first longitudinal end 28 of the housing 12 for attaching the first sliding member to an object 30 whose movement is to be controlled. The second sliding member 20 has a second extension 32, such as a cable or rod extending outwardly from a second longitudinal end 34 of the housing 12 for controlling the movement of the object 30 as explained more fully below. As shown in FIGS. 1B and 1C, the first and second sliding members 16, 20 and associated first and second cavities 14, 18 are round or circular in cross-section, but can be square, rectangular or other practical shapes without departing from the scope of the present invention.

The first cavity 14 and the second cavity 18 each extend longitudinally within the housing 12 and in parallel relation to one another generally from the first longitudinal end 28 to the second longitudinal end 34. The housing 12 includes or accommodates a partition 36 generally extending from the first longitudinal end 28 to the second longitudinal end 34 of the housing 12. The partition 36 generally separates the first cavity 14 and the second cavity 18. The first cavity 14 is more specifically defined by a first side 38 of the partition 36 and an opposing inner side 40 of the housing 12. Likewise, the second cavity 18 is more specifically defined by a second side 42 of the partition 36 and an opposing inner side 44 of the housing 12. As shown in FIGS. 1-3, the first side 38 and the second side 42 of the partition 36 face opposite directions relative to each other.

The partition 36 defines an opening 46 between the first cavity 14 and the second cavity 18 disposed about longitudinally midway between the first longitudinal end 28 and the second longitudinal end 34 of the housing 12. As shown in FIGS. 1-3, the opening 46 is disposed closer to the first longitudinal end 28 relative to the second longitudinal end 34. Alternatively, the opening 46 can be disposed midway between the first longitudinal end 28 and the second longitudinal end 34, or be disposed closer to the second longitudinal end 34 relative to the first longitudinal end 28 without departing from the scope of the present invention.

The first sliding member 16 generally defines an outer surface 48 shaped for abutting against and being guided by the first side 38 of the partition 36 and the opposing inner side 40 of the housing 12. Likewise, the second sliding member 20 generally defines an outer surface 50 shaped for abutting against and being guided by the second side 42 of the partition 36 and the opposing inner side 44 of the housing 12. The outer surface 48 of the first sliding member 16 has a longitudinal portion defining a first recess 52 relative to and facing the first side 38 of the partition 36. Likewise, the outer surface 50 of the second sliding member 20 has a longitudinal portion defining a second recess 54 relative to and facing the second side 42 of the partition 36.

Figure 3A:
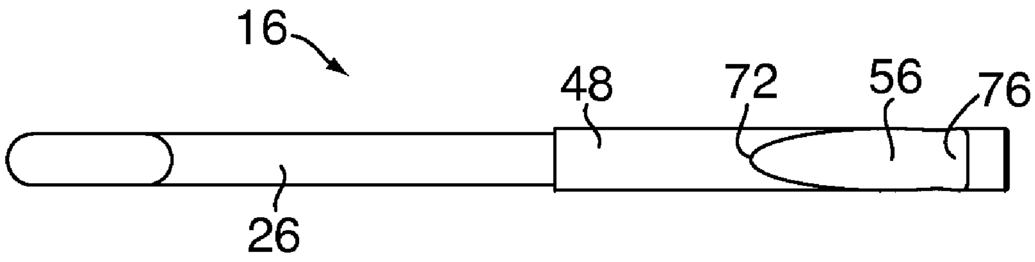
FIG. 3A is a plan view of a controlled member of a motion control device in accordance with the present invention.
Figure 3B:
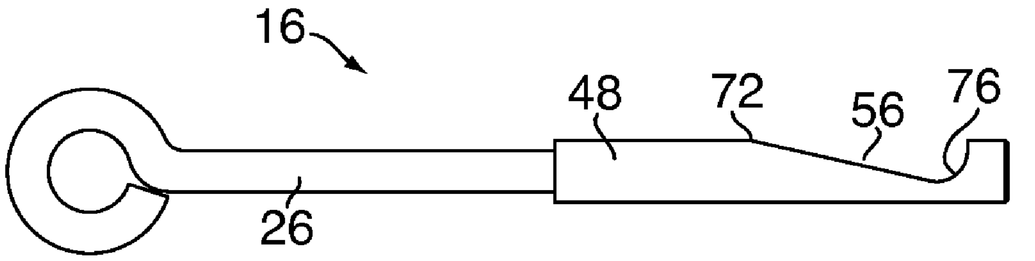
FIG. 3B is a side elevation view of the controlled member of FIG. 3A.
Figure 3C:
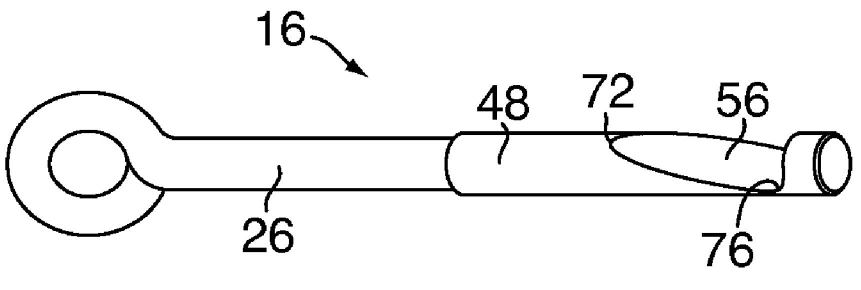
FIG. 3C is a perspective view of the controlled member of FIG. 3A.

As best shown in FIGS. 3A through 3C, the portion of the outer surface 48 defining the first recess 52 is generally J-shaped as seen in cross-section and includes a straight portion 56 and a curved portion 58 as seen in a direction from the first longitudinal end 28 to the second longitudinal end 34 of the housing 12. The straight portion 56 defines an inclined plane relative to the first side 38 of the partition 36. A portion of the outer surface 48 of the first sliding member 16 facing the partition 36 and forming the straight portion 56 or inclined plane is directed away from the first side 38 of the partition 36 in a direction from the first longitudinal end 28 to the second longitudinal end 34 of the housing 12. A portion of the outer surface 48 of the first sliding member 16 facing the partition 36 and forming the curved portion 58 is directed toward the first side 38 of the partition 36 in a direction from the first longitudinal end 28 to the second longitudinal end 34 of the housing 12.

The portion of the outer surface 50 defining the second recess 54 is generally J-shaped and includes a straight portion 60 and a curved portion 62 as seen in a direction from the second longitudinal end 34 to the first longitudinal end 28 of the housing 12. The straight portion 60 defines an inclined plane relative to the second side 42 of the partition 36. A portion of the outer surface 50 of the second sliding member 20 facing the partition 36 and forming the straight portion 60 or inclined plane is directed away from the second side 42 of the partition 36 in a direction from the second longitudinal end 34 to the first longitudinal end 28 of the housing 12. A portion of the outer surface 50 of the second sliding member 20 facing the partition 36 and forming the curved portion 62 is directed toward the second side 42 of the partition 36 in a direction from the second longitudinal end 34 to the first longitudinal end 28 of the housing 12. As shown in FIGS. 1-3, the inclined planes 56, 60 defined by the first and second sliding members 16, 20 extend in a parallel direction relative to each other.

A motion limiting member 64 such as, for example, a circular member as shown in FIGS. 1-3, is disposed within the opening 46 of the partition 36. The motion limiting member 64 protrudes at one end into the first recess 52 and abuts the outer surface 48 of the first sliding member 16 forming the straight portion 56 and the curved portion 58. Likewise, the motion limiting member 64 protrudes at an opposite end into the second recess 54 and abuts the outer surface 50 of the second sliding member 20 forming the straight portion 60 and the curved portion 62. The partition 36 prevents the motion limiting member 64 from moving in a longitudinal direction with the sliding members 16, 20. As a result, the motion limiting member 64 is limited to movement through the opening 46 and in a direction perpendicular to the direction of movement of the sliding members 16, 20.

A resilient member 66 such as, for example, a compression spring is disposed between an inner side 68 of the housing 12 adjacent to the second longitudinal end 34 and an opposing longitudinal end 70 of the second sliding member 20 to urge a portion of the outer surface 50 defining the second recess 54 toward and against the motion limiting member 64 and to cause the motion limiting member to press against the first sliding (controlled) member 16 at the portion of the outer surface 48 defining the first recess 52 when there is no pulling force on the second extension 32 of the second sliding (controlling) member 20. In effect, the resilient member 66 urges the inclined plane 60 of the second sliding (controlling) member 20 against the motion limiting member 64 which in turn pushes the other side of the motion limiting member into contact with the inclined plane 56 of the first sliding (controlled) member 16. The motion limiting member 64 is thus wedged between the inclined planes 56, 60 so as to prevent the controlled member 16 from moving further beyond this controlled position toward the second longitudinal end 34 of the housing 12.

As shown in FIGS. 1-3, a first end 72 of the first recess 52 is longitudinally aligned with a first end 74 of the second recess 54. Likewise, a second end 76 of the first recess 52 is longitudinally aligned with a second end 78 of the second recess 54. The surfaces defining the straight portion 56 and the curved portion 58 of the first sliding member 16, and the surfaces defining the straight portion 60 and the curved portion 62 of the second sliding member 20 cooperate to form a slot or track in which the motion limiting member 64 moves relative to the track as explained more fully below. As seen in cross-section, the straight portion 56 of the first sliding member 16 extends in a direction parallel to the straight portion 60 of the second sliding member 20. Moreover, the curved portions 58, 62 serve as stops for limiting the range of movement of the sliding members 16, 20 within the respective first and second cavities 14, 18. For example, the curved portion 58 abuts against the motion limiting member 64 when the first sliding member 16 is in a fully extended position as shown in FIG. 2A.

In operation, the device 10 restricts and allows the movement of the first sliding (controlled) member 16 by the positioning of the second sliding (controlling) member 20. The motion of the first sliding member 16 can be controlled in one direction so as to provide step-less, continuously variable positioning as well as an arresting of motion. The second extension 32 is configured to be pulled either manually or by an external mechanism a predetermined controlled distance in a direction away from the housing 12. For example, the second sliding (controlling) member 20 can be moved toward the second longitudinal end 34 of the housing. As the second sliding member 20 moves in the above-mentioned direction, the straight portion or inclined plane 60 of the second sliding (controlling) member 20 abutting the motion limiting member 64 moves away from the opposing surface of the straight portion or inclined plane 56 of the first sliding (controlled) member 16. The first sliding member 16 is then able to be moved the controlled distance toward the second longitudinal end 34. As the first sliding member 20 moves over the controlled distance, the straight portion or inclined plane 56 of the first sliding member 16 moves toward the opposing surface of the straight portion or inclined plane 60 of the second sliding member 20 until the motion limiting member 64 simultaneously contacts both straight portions 56, 60 of the sliding members 16, 20 so as to prevent the first sliding member 16 from moving beyond the controlled distance. If the first sliding member 16 is attempted to be moved beyond the controlled distance, the resilient member 66 forces the straight portion or inclined plane 60 of the second sliding (controlling) member 20 to press against the motion limiting member 64, and the motion limiting member to in turn press against the straight portion or inclined plane 56 of the first sliding (controlled) member 16. The motion limiting member 64 becomes wedged against the straight portions or inclined planes 56, 60 of the sliding members 16, 20 so as to prevent the first sliding member 16 from moving beyond the controlled distance.

The first sliding (controlled) member 16 is generally permitted to be moved or returned in a direction toward the first longitudinal end 28 of the housing 12. As the first sliding member 16 is moved in a direction toward the first longitudinal end 28, the straight portion 56 of the first sliding member 16 moves away from the opposing surface of the straight portion or inclined plane 60 of the second sliding member 20. The resilient member 66 pushes against the opposing end 70 of the second sliding member 20 so as to urge the second sliding member 20 toward the first longitudinal end 28 of the housing 12. The straight portion 60 of the second sliding member 20 contacting the motion limiting member 64 moves toward the opposing surface of the straight portion or inclined plane 56 of the first sliding member 16 until the motion limiting member 64 contacts and wedges against the opposing surface.

In sum, any force applied to the device 10 in a direction that would move the extensions 26, 32 of the sliding members 16, 20 into the housing 12 and toward each other forces the combination of the inclined planes 56, 60 and the motion limiting member 64 to wedge in the housing. This wedging restricts relative motion between the parts of the device 10 and provides a positive locking action. If a force is then applied to the device 10 that would move the extensions 26, 32 of the sliding members 16, 20 apart, the sliding members become freed in the housing 12 and relative motion between the sliding members is allowed.

The device 10 is ideal for providing positioning control by restricting movement of some other device or machine element. Typically the device 10 is mounted by attaching the housing 12 in an appropriate location and using the locked position of the second sliding (controlled) member 20 to prevent other elements or equipment attached to the first sliding (controlling) member 16 from moving beyond a certain point. Because the locked position is controllable, the device 10 can stop movement at intervals as needed or at predetermined intervals. As will be explained below, by using two controlling members mounted facing in opposite directions, bidirectional control can be provided.

Figure 4A:
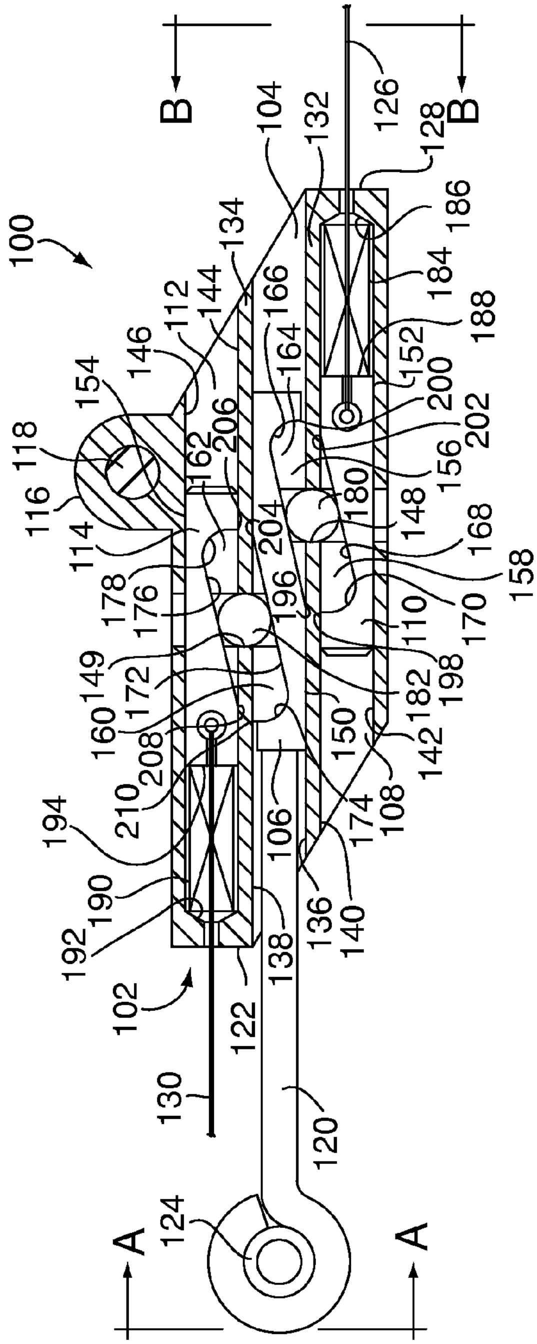
FIG. 4A is a cross-sectional, side elevation view of a motion control device in accordance with a second embodiment of the present invention.
Figure 4B:
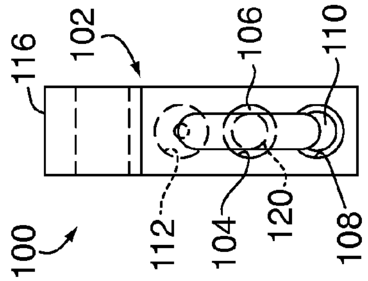
FIG. 4B is an end view of the motion control device of FIG. 4A taken along the line A-A.
Figure 4C:
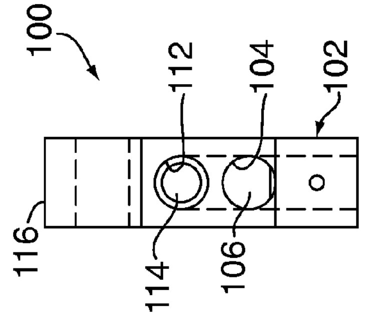
FIG. 4C is an end view of the motion control device of FIG. 4A taken along the line B-B.
Figure 5A:
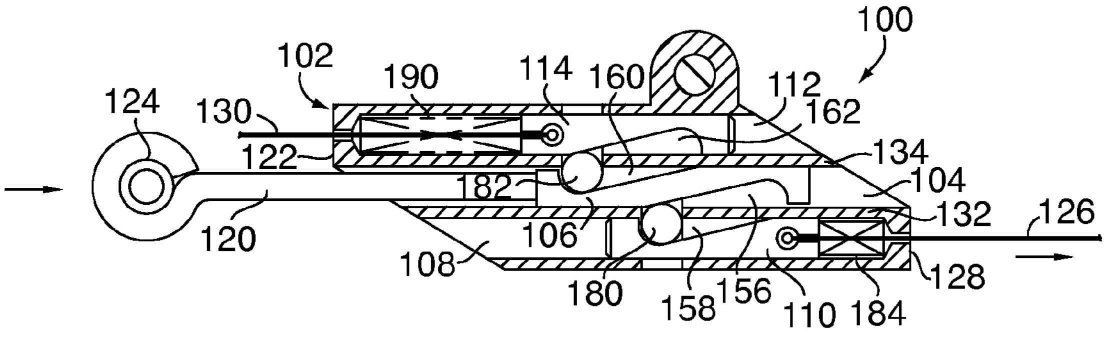
FIG. 5A is a cross-sectional, side elevation view of the motion control device of FIG. 4A in a fully retracted position.
Figure 5B:
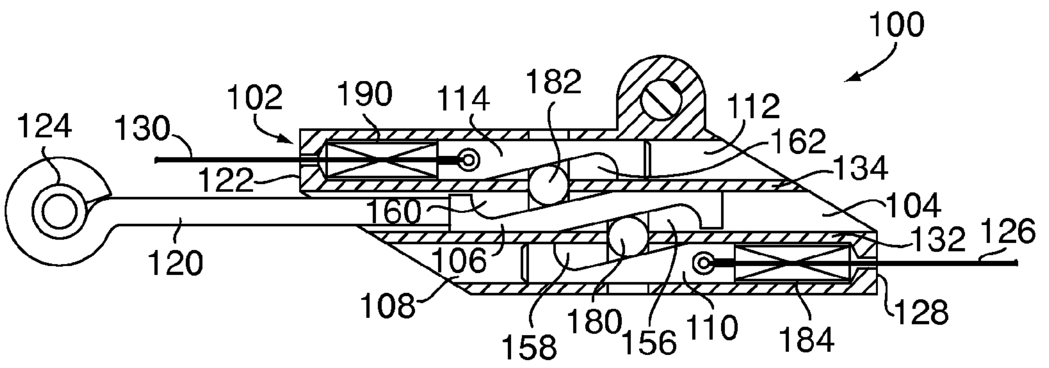
FIG. 5B is a cross-sectional, side elevation view of the motion control device of FIG. 4A in a midpoint position.

With reference to FIGS. 4 and 5, a motion bidirectional control device in accordance with a second embodiment of the present invention is indicated generally by the reference number 100. The device 100 comprises a housing 102 defining a first cavity 104 accommodating a first sliding (controlled) member 106 for movement therealong, a second cavity 108 accommodating a second sliding (controlling) member 110 for movement therealong, and a third cavity 112 accommodating a third sliding (controlling) member 114 for movement therealong. The first sliding member 106 serves as a controlled member, and the second and third sliding members 110, 114 serve as controlling members. The housing 102 includes a projection 116 such as a mounting lug for attaching the housing to an external support 118. The first sliding member 106 includes a first extension 120 projecting outwardly from a first longitudinal end 122 of the housing 102 for attaching the first sliding member to an object 124 whose movement is to be controlled. The second sliding member 110 has a second extension 126, such as a cable or rod extending outwardly from a second longitudinal end 128 of the housing 102 for controlling the movement of the object 124 in a first direction. The third sliding member 114 has a third extension 130, such as a cable or rod extending outwardly from the first longitudinal end 122 of the housing 102 for controlling the movement of the object 124 in a second direction as explained more fully below. As shown in FIGS. 4B and 4C, the first, second and third sliding members 106, 110, 114 and associated first, second and third cavities 104, 108, 112 are round or circular in cross-section, but can be square, rectangular or other practical shapes without departing from the scope of the present invention.

The first cavity 104, the second cavity 108 and the third cavity 112 each extend longitudinally within the housing 102 and in parallel relation to one another generally from the first longitudinal end 122 to the second longitudinal end 128. The housing 102 includes or accommodates a first partition 132 and a second partition 134 each generally extending from the first longitudinal end 122 to the second longitudinal end 128 of the housing 102.

The first partition 132 generally separates the first cavity 104 and the second cavity 108. The first cavity 104 is more specifically defined by a first side 136 of the first partition 132 and a first side 138 of the second partition 134. The second cavity 108 is more specifically defined by a second side 140 of the first partition 132 and an opposing inner side 142 of the housing 102. As shown in FIGS. 4 and 5, the first side 136 and the second side 140 of the first partition 132 face opposite directions relative to each other.

The second partition 134 generally separates the first cavity 104 and the third cavity 112. As mentioned above, the first cavity 104 is more specifically defined by the first side 136 of the first partition 132 and the first side 138 of the second partition 134. The third cavity 112 is more specifically defined by a second side 144 of the second partition 134 and an opposing inner side 146 of the housing 102. As shown in FIGS. 4 and 5, the first side 138 and the second side 144 of the second partition 134 face opposite directions relative to each other.

The first partition 132 defines a first opening 148 between the first cavity 104 and the second cavity 108 and is disposed between the first longitudinal end 122 and the second longitudinal end 128 of the housing 102. Similarly, the second partition 134 defines a second opening 149 between the first cavity 104 and the third cavity 112 and is disposed between the first longitudinal end 122 and the second longitudinal end 128 of the housing 102.

The first sliding member 106 generally defines an outer surface 150 shaped for abutting against and being guided by the first side 136 of the first partition 132 and the first side 138 of the second partition 134. Likewise, the second sliding member 110 generally defines an outer surface 152 shaped for abutting against and being guided by the second side 140 of the first partition 132 and the opposing inner side 142 of the housing 102. Similarly, the third sliding member 114 generally defines an outer surface 154 shaped for abutting against and being guided by the second side 144 of the second partition 134 and the opposing inner side 146 of the housing 102. The outer surface 150 of the first sliding member 106 has a longitudinal portion defining a first recess 156 relative to and facing the first side 136 of the first partition 132. The outer surface 152 of the second sliding member 110 has a longitudinal portion defining a second recess 158 relative to and facing the second side 140 of the first partition 132. Moreover, the outer surface 150 of the first sliding member 106 has a longitudinal portion defining a third recess 160 relative to and facing the first side 138 of the second partition 134. The outer surface 154 of the third sliding member 114 has a longitudinal portion defining a fourth recess 162 relative to and facing the second side 144 of the second partition 134.

The portion of the outer surface 150 defining the first recess 156 is generally J-shaped as seen in cross-section and includes a straight portion 164 and a curved portion 166 as seen in a direction from the first longitudinal end 122 to the second longitudinal end 128 of the housing 102. The straight portion 164 defines an inclined plane relative to the first side 136 of the first partition 132. A portion of the outer surface 150 of the first sliding member 106 facing the first partition 132 and forming the straight portion 164 or inclined plane is directed away from the first side 136 of the first partition 132 in a direction from the first longitudinal end 122 to the second longitudinal end 128 of the housing 102. A portion of the outer surface 150 of the first sliding member 106 facing the first partition 132 and forming the curved portion 166 is directed toward the first side 136 of the first partition 132 in a direction from the first longitudinal end 122 to the second longitudinal end 128 of the housing 102.

The portion of the outer surface 152 defining the second recess 158 is generally J-shaped and includes a straight portion 168 and a curved portion 170 as seen in a direction from the second longitudinal end 128 to the first longitudinal end 122 of the housing 102. The straight portion 168 defines an inclined plane relative to the second side 140 of the first partition 132. A portion of the outer surface 152 of the second sliding member 110 facing the first partition 132 and forming the straight portion 168 or inclined plane is directed away from the second side 140 of the first partition 132 in a direction from the second longitudinal end 128 to the first longitudinal end 122 of the housing 102. A portion of the outer surface 152 of the second sliding member 110 facing the first partition 132 and forming the curved portion 170 is directed toward the second side 140 of the first partition 132 in a direction from the second longitudinal end 128 to the first longitudinal end 122 of the housing 102. As shown in FIGS. 4 and 5, the inclined planes defined by the first and second sliding members 106, 110 extend in a parallel direction relative to each other.

The portion of the outer surface 150 defining the third recess 160 is generally J-shaped as seen in cross-section and includes a straight portion 172 and a curved portion 174 as seen in a direction from the second longitudinal end 128 to the first longitudinal end 122 of the housing 102. The straight portion 172 defines an inclined plane relative to the first side 138 of the second partition 134. A portion of the outer surface 150 of the first sliding member 106 facing the second partition 134 and forming the straight portion 172 or inclined plane is directed away from the first side 138 of the second partition 134 in a direction from the second longitudinal end 128 to the first longitudinal end 122 of the housing 102. A portion of the outer surface 150 of the first sliding member 106 facing the second partition 134 and forming the curved portion 174 is directed toward the first side 138 of the second partition 134 in a direction from the second longitudinal end 128 to the first longitudinal end 122 of the housing 102.

The portion of the outer surface 154 defining the fourth recess 162 is generally J-shaped and includes a straight portion 176 and a curved portion 178 as seen in a direction from the first longitudinal end 122 to the second longitudinal end 128 of the housing 102. The straight portion 176 defines an inclined plane relative to the second side 144 of the second partition 134. A portion of the outer surface 154 of the third sliding member 114 facing the second partition 134 and forming the straight portion 176 or inclined plane is directed away from the second side 144 of the second partition 134 in a direction from the first longitudinal end 122 to the second longitudinal end 128 of the housing 102. A portion of the outer surface 154 of the third sliding member 114 facing the second partition 134 and forming the curved portion 178 is directed toward the second side 144 of the second partition 134 in a direction from the first longitudinal end 122 to the second longitudinal end 128 of the housing 102. As shown in FIGS. 4 and 5, the inclined planes defined by the first and third sliding members 106, 114 extend in a parallel direction relative to each other.

A first motion limiting member 180 such as, for example, a circular member as shown in FIGS. 4 and 5, is disposed within the first opening 148 of the first partition 132. The first motion limiting member 180 protrudes at one end into the first recess 156 and abuts the outer surface 150 of the first sliding member 106 forming the straight portion 164 and the curved portion 166. Likewise, the first motion limiting member 180 protrudes at an opposite end into the second recess 158 and abuts the outer surface of the second sliding member 110 forming the straight portion 168 and the curved portion 170. The first partition 132 prevents the first motion limiting member 180 from moving in a longitudinal direction with the first and second sliding members 106, 110. As a result, the first motion limiting member 180 is limited to movement through the first opening 148 and in a direction perpendicular to the direction of movement of the first and second sliding members 106, 110.

A second motion limiting member 182 such as, for example, a circular member as shown in FIGS. 4 and 5, is disposed within the second opening 149 of the second partition 134. The second motion limiting member 182 protrudes at one end into the fourth recess 162 and abuts the outer surface 154 of the third sliding member 114 forming the straight portion 176 and the curved portion 178. Likewise, the second motion limiting member 182 protrudes at an opposite end into the third recess 160 and abuts the outer surface 150 of the first sliding member 106 forming the straight portion 172 and the curved portion 174. The second partition 134 prevents the second motion limiting member 182 from moving in a longitudinal direction with the first and third sliding members 106, 114. As a result, the second motion limiting member 182 is limited to movement through the second opening 149 and in a direction perpendicular to the direction of movement of the first and third sliding members 106, 114.

A first resilient member 184 such as, for example, a compression spring is disposed between an inner side 186 of the housing 102 adjacent to the second longitudinal end 128 and a longitudinal end 188 of the second sliding member 110 to urge the second sliding member toward and against the first motion limiting member 180 and to cause the first motion limiting member to press against the first sliding member 106 at the portion of the outer surface 150 defining the first recess 156 when there is no pulling force on the second extension 126 of the second sliding (controlling) member 110. In effect, the first resilient member 184 urges the inclined plane 168 of the second sliding (controlling) member 110 against the first motion limiting member 180 which in turn pushes the other side of the first motion limiting member into contact with the inclined plane 164 of the first sliding (controlled) member 106. The first motion limiting member 180 is thus wedged between the inclined planes 164, 168 so as to prevent the controlled member 106 from moving further beyond this controlled position toward the second longitudinal end 128 of the housing 102.

A second resilient member 190 such as, for example, a compression spring is disposed between an inner side 192 of the housing 102 adjacent to the first longitudinal end 122 and a longitudinal end 194 of the third sliding member 114 to urge the third sliding member toward and against the second motion limiting member 182 and to cause the second motion limiting member to press against the first sliding (controlled) member 106 at the portion of outer surface 150 defining the third recess 160 when there is no pulling force on the third extension 130 of the third sliding (controlling) member 114. In effect, the second resilient member 190 urges the inclined plane 176 of the third sliding (controlling) member 114 against the second motion limiting member 182 which in turn pushes the other side of the second motion limiting member into contact with the inclined plane 172 of the first sliding (controlled) member 106. The second motion limiting member 182 is thus wedged between the inclined planes 172, 176 so as to prevent the controlled member 106 from moving further beyond this controlled position toward the first longitudinal end 122 of the housing 102.

Figure 5C:
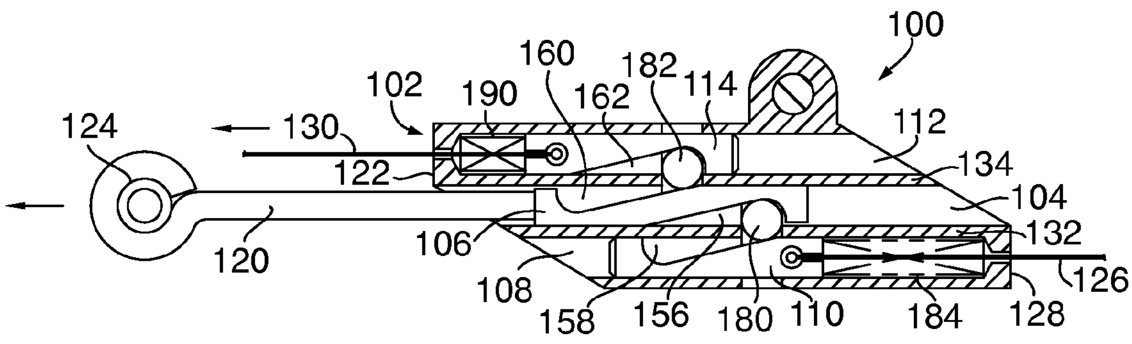
FIG. 5C is a cross-sectional, side elevation view of the motion control device of FIG. 4A in a fully extended position.

As shown in FIGS. 4 and 5, a first end 196 of the first recess 156 is longitudinally aligned with a first end 198 of the second recess 158. Likewise, a second end 200 of the first recess 156 is longitudinally aligned with a second end 202 of the second recess 158. The surfaces defining the straight portion 164 and the curved portion 166 of the first sliding member 106, and the surfaces defining the straight portion 168 and the curved portion 170 of the second sliding member 110 cooperate to form a first slot or track in which the first motion limiting member 180 moves relative to the first track as explained more fully below. As seen in cross-section, the straight portion 164 of the first sliding member 106 extends in a direction parallel to the straight portion 168 of the second sliding member 110. Moreover, the curved portions 166, 170 serve as stops for limiting the range of movement of the first and second sliding members 106, 110 within the respective first and second cavities 104, 108. For example, the curved portion 166 abuts against the first motion limiting member 180 when the first sliding member 106 is in a fully extended position as shown in FIG. 5C.

As shown in FIGS. 4 and 5, a first end 204 of the fourth recess 162 is longitudinally aligned with a first end 206 of the third recess 160. Likewise, a second end 208 of the fourth recess 162 is longitudinally aligned with a second end 210 of the third recess 160. The surfaces defining the straight portion 176 and the curved portion 178 of the third sliding member 114, and the surfaces defining the straight portion 172 and the curved portion 174 of the first sliding member 106 cooperate to form a second slot or track in which the second motion limiting member 182 moves relative to the second track as explained more fully below. As seen in cross-section, the straight portion 176 of the third sliding member 114 extends in a direction parallel to the straight portion 172 of the first sliding member 106. Moreover, the curved portions 174, 178 serve as stops for limiting the range of movement of the first and third sliding members 106, 114 within the respective first and third cavities 104, 112. For example, the curved portion 174 abuts against the second motion limiting member 182 when the first sliding member 106 is in a fully extended position as shown in FIG. 5C.

In operation, the device 100 restricts and allows the movement of the first sliding (controlled) member 106 by the positioning of the second sliding (controlling) member 110 or the third sliding (controlling) member 114. The motion of the first sliding member 106 can be controlled in either direction so as to provide step-less, continuously variable positioning as well as an arresting of motion. The second extension 126 is configured to be pulled either manually or by an external mechanism a predetermined controlled distance in a direction away from the housing 102. For example, the second sliding (controlling) member 110 can be moved toward the second longitudinal end 128 of the housing. As the second sliding member 110 moves in the above-mentioned direction, the straight portion or inclined plane 168 of the second sliding (controlling) member 110 abutting the first motion limiting member 180 moves away from the opposing surface of the straight portion or inclined plane 164 of the first sliding (controlled) member 106. The first sliding member 106 is then able to be moved the controlled distance toward the second longitudinal end 128. As the first sliding member 106 moves over the controlled distance, the straight portion or inclined plane 164 of the first sliding member 106 moves toward the opposing surface of the straight portion or inclined plane 168 of the second sliding member 110 until the first motion limiting member 180 simultaneously contacts both straight portions or inclined planes 164, 168 of the first and second sliding members 106, 110 so as to prevent the first sliding member 106 from moving beyond the controlled distance.

If the first sliding member 106 is attempted to be moved beyond the controlled distance, the first resilient member 184 forces the straight portion or inclined plane 168 of the second sliding (controlling) member 110 to press against the first motion limiting member 180, and the first motion limiting member to in turn press against the straight portion or inclined plane 164 of the first sliding (controlled) member 106. The first motion limiting member 180 becomes wedged against the straight portions or inclined planes 164, 168 of the first and second sliding members 106, 110 so as to prevent the first sliding member 106 from moving beyond the controlled distance.

The third extension 130 is configured to be pulled either manually or by an external mechanism a predetermined controlled distance in a direction away from the housing 102 such that the third sliding (controlling) member 114 moves toward the first longitudinal end 122 of the housing. As the third sliding member 114 moves in the above-mentioned direction, the straight portion or inclined plane 176 of the third sliding (controlling) member 114 abutting the second motion limiting member 182 moves away from the opposing surface of the straight portion or inclined plane 172 of the first sliding (controlled) member 106. The first sliding member 106 is then able to be moved the controlled distance toward the first longitudinal end 122. As the first sliding member 106 moves over the controlled distance, the straight portion or inclined plane 172 of the first sliding member 106 moves toward the opposing surface of the straight portion or inclined plane 176 of the third sliding member 114 until the second motion limiting member 182 simultaneously contacts both straight portions or inclined planes 172, 176 of the first and third sliding members 106, 114 so as to prevent the first sliding member 106 from moving beyond the controlled distance.

If the first sliding member 106 is attempted to be moved beyond the controlled distance, the second resilient member 190 forces the straight portion or inclined plane 176 of the third sliding (controlling) member 114 to press against the second motion limiting member 182, and the second motion limiting member to in turn press against the straight portion or inclined plane 172 of the first sliding (controlled) member 106. The second motion limiting member 182 becomes wedged against the straight portions or inclined planes 172, 176 of the first and third sliding members 106, 114 so as to prevent the first sliding member 106 from moving beyond the controlled distance.

In sum, any force applied to the device 100 in a direction that would move the extensions 120, 126 of the first and second sliding members 106, 110 into the housing 102 and toward each other forces the combination of the inclined planes 164, 168 and the first motion limiting member 180 to wedge in the housing. This wedging restricts relative motion between the parts of the device 100 and provides a positive locking action. If a force is then applied to the device 100 that would move the extensions 120, 126 of the first and second sliding members 106, 110 apart, the sliding members become freed in the housing 102 and relative motion between the first and second sliding members is allowed.

Moreover, any force applied to the device 100 in a direction that would move the extensions 120, 130 of the first and third sliding members 106, 114 into the housing 102 forces the combination of the inclined planes 172, 176 and the second motion limiting member 182 to wedge in the housing. This wedging restricts relative motion between the parts of the device 100 and provides a positive locking action. If a force is then applied to the device 100 that would move the extensions 120, 130 of the first and third sliding members 106, 114 away from the housing, the sliding members become freed in the housing 102 and relative motion between the first and third sliding members is allowed.

The present invention as described above permits motion to be controlled in very small increments relative to the load being carried. The precision of control is very high relative to the precision needed for the components of a control device embodying the present invention. The control devices in accordance with the present invention can be constructed using conventional low cost methods, and can be assembled and disassembled without tools. The components of the control device can be made of a wide variety of materials that are chosen to meet the demands of the intended application, and various size models can be made to accommodate different conditions of use.

The control device of the present invention is easily adapted and integrated with other machine elements. Attachments to the device housing can be made at many different points. The exterior shape of the housing is not critical to function. Moreover, the motion limiting member having a spherical or cylindrical shape contacting flat surfaces permits the control device to inherently tolerate a significant degree of inaccuracy in the component parts. This allows low cost versions of the control device to be produced that can function well where conventional devices requiring precision parts are not as effective.

As will be recognized by those of ordinary skill in the pertinent art, numerous modifications and substitutions can be made to the above-described embodiments of the present invention without departing from the scope of the invention. Accordingly, the preceding portion of this specification is to be taken in an illustrative, as opposed to a limiting sense.

What is claimed is:

1. A device for controlling motion of an object, comprising:

a housing defining a first cavity, a second cavity and a third cavity each extending from a first longitudinal end to a second longitudinal end of the housing, the third cavity being disposed on an opposite side of the first cavity relative to the second cavity, the housing including a partition separating the first cavity and the second cavity, and the housing including an additional partition separating the first cavity and the third cavity;

a first sliding member movable within the first cavity, the first sliding member including a first extension extending outwardly from the first longitudinal end of the housing for being attached to the object whose movement is to be controlled;

a second sliding member movable within the second cavity, the second sliding member including a second extension extending outwardly from one of the first and second longitudinal ends of the housing for being pulled a variably controlled distance away from the housing;

a motion limiting member communicating with the first sliding member and the second sliding member, the motion limiting member being configured to cooperate with the first and second sliding members such that movement of the second extension of the second sliding member the variably controlled distance in a direction away from the housing causes the first extension of the first sliding member to be movable the variably controlled distance in the direction in which the second sliding member is pulled;

a third sliding member movable within the third cavity, the third sliding member including a third extension extending outwardly from the other of the first and second longitudinal ends of the housing, relative to the second extension, for being pulled a variably controlled distance; and an additional motion limiting member communicating with the first sliding member and the third sliding member, the additional motion limiting member being configured to cooperate with the first and third sliding members such that movement of the third extension of the third sliding member the variably controlled distance in a direction away from the housing causes the first extension of the first sliding member to be movable the variably controlled distance in which the third sliding member is pulled.

2. A device as defined in claim 1, wherein the third sliding member extends outwardly from the first longitudinal end of the housing.

3. A device as defined in claim 1, wherein the second extension extends outwardly from the second longitudinal end of the housing.

4. A device as defined in claim 1, wherein the motion limiting member is a circular member at least partly disposed within an opening defined by the partition.

5. A device as defined in claim 1, wherein the additional motion limiting member is a circular member at least partly disposed within an opening defined by the additional partition.

6. A device as defined in claim 1, further comprising a resilient member disposed between said one of the first and second longitudinal ends of the housing and the second sliding member so as to urge the second sliding member into contact with the motion limiting member when the second extension is not being pulled, to cause the motion limiting member to be wedged between the first and second sliding members, and to further prevent the first sliding member from moving beyond the controlled distance.

7. A device as defined in claim 6, further comprising an additional resilient member disposed between said other of the first and second longitudinal ends of the housing and the third sliding member so as to urge the third sliding member into contact with the additional motion limiting member when the third extension is not being pulled, to cause the additional motion limiting member to be wedged between the first and third sliding members, and to further prevent the first sliding member from moving beyond the controlled distance.

8. A device as defined in claim 7, wherein the additional resilient member includes a compression spring.

9. A device as defined in claim 6, wherein the resilient member includes a compression spring.

* * * * *